United States Patent [19]

Matsuda et al.

[11] 4,387,988
[45] * Jun. 14, 1983

[54] AUTOMATIC DISTANCE MEASURING DEVICE

[75] Inventors: Motonobu Matsuda, Kawachinagano; Yoshihiro Tanaka, Osaka, both of Japan

[73] Assignee: Minolta Camera Kabushiki Kaisha, Osaka, Japan

[*] Notice: The portion of the term of this patent subsequent to Dec. 1, 1998, has been disclaimed.

[21] Appl. No.: 285,878

[22] Filed: Jul. 23, 1981

Related U.S. Application Data

[63] Continuation of Ser. No. 65,747, Aug. 10, 1979, Pat. No. 4,303,335.

[30] Foreign Application Priority Data

Aug. 21, 1978 [JP] Japan .................... 53/102180

[51] Int. Cl.³ ................... G01C 3/10; G01C 3/05
[52] U.S. Cl. ............................... 356/1; 356/4
[58] Field of Search .......................... 356/1, 4

[56] References Cited

U.S. PATENT DOCUMENTS 3,723,003  3/1973  Vockenhuber et al. ............ 354/25
3,736,057  5/1973  Harvey ................................ 356/1
4,040,738  8/1977  Wagner ............................... 356/1

*Primary Examiner*—S. C. Buczinski
*Attorney, Agent, or Firm*—Wenderoth, Lind & Ponack

[57] ABSTRACT

A distance measuring device comprises a light emitter, a light receiver including a plurality of photo-responsive elements for sensing the pulsating light beam emitted by the light emitter and subsequently reflected from a target object relative to which the distance from the device is to be measured, and a signal processing circuit. The signal processing circuit includes a logic circuit so designed as to determine the applicability of an output signal from one of light measuring circuits connected to the respective photoresponsive elements in relation to output signals from the other of the light measuring circuit.

11 Claims, 7 Drawing Figures

AUTOMATIC DISTANCE MEASURING DEVICE

The present application is a continuation of application Ser. No. 65,747, filed Aug. 10, 1979, now U.S. Pat. No. 4,303,335.

BACKGROUND OF THE INVENTION

The present invention generally relates to an automatic distance measuring device of a type utilizing the principle of triangulation and, more particularly, to an electric rangefinder circuit for processing an output signal generated from a light measuring circuit.

There is known an automatic rangefinder for use in a photographic camera, which range finder comprises a light emitter for projecting pulsating light necessary to illuminate a target object located within one of a plurality of zones at different distances away from the camera, a light receiver for detecting the pulsating light reflected from the target object and including photoresponsive elements so arranged as to monitor the respective zones, each of the photoresponsive elements producing an output the magnitude of which varies as a function of the intensity of the pulsating light detected thereby, and means coupled to the light receiver and responsive to a change in magnitude of the output of any one of the photoresponsive elements to provide an automatic focus control signal necessary to actuate a trigger mechanism to bring the objective lens to one of the focal positions which corresponds to the distance from the camera to such one of the zones when the magnitude of the output of one of the photoresponsive elements monitoring such one of the zones of distances has actually varied due to the presence of the target object in such one of the zones.

Examples of the automatic rangefinder of the type referred to above are disclosed in U.S. Pat. No. Re. 27,461 reissued on Aug. 15, 1972, U.S. Pat. No. 3,723,003 patented on Mar. 27, 1973, and Japanese Patent Laid open Publication No. 49-49625 laid open to public inspection on May 14, 1974.

In a normal case, it is expected that the magnitude of the output of one of photoresponsive elements of the light receiver varies due to the presence of the target object in a corresponding zone. One distance range can be correspondingly determined in response to the light receiver in this normal case to control the focus of the objective lens or to display the distance measuring result. However, if a plurality of photoresponsive elements vary their magnitude of outputs for some reason, e.g., due to a change in ambient light, at the same time, the distance determination will be confused and result in a failure in controlling the focus or displaying the distance information. This confusion is particularly noticible when at least a pair of photoresponsive elements, which monitor at least a pair of non-neighboring zones, vary the magnitude of their outputs.

SUMMARY OF THE INVENTION

An object of the present invention is to provide an improved distance measuring device in which the above described possible confusion in determining the distance information is removed.

Another important object of the present invention is to provide an improved distance measuring device which operates effectively to measure the distance precisely.

According to the present invention, there is provided an improved distance measuring device which comprises means for directing a beam of light towards a target object and means for receiving the beam of light reflected from the target object. The receiving means has a plurality of light sensing portions, the optical axes of which intersect the path of travel of the beam of light from different distances from the directing means.

The improved distance measuring device further comprises means responsive to the receiving means for signaling whether or not each of the light sensing portions senses light, respectively, and means for detecting when the signaling means signals that at least a pair of the light sensing portions which are in a predetermined relationship sense light.

The predetermined relationship of the light sensing portions of the pair is such that the optical axes of the light sensing portions of the pair which receive light intersect the path of travel of the beam of light for non-neighbouring distance zones, respectively.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
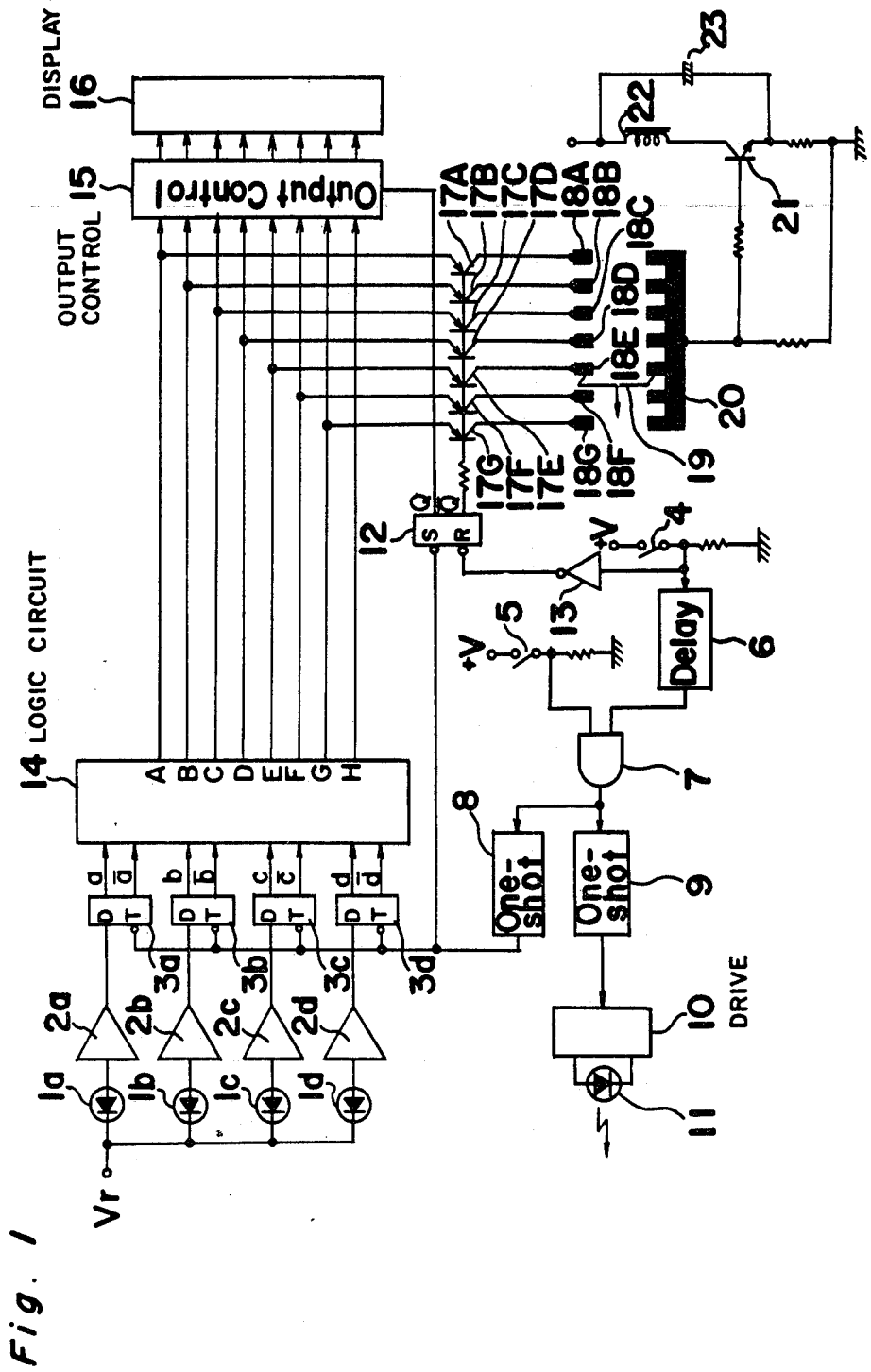
FIG. 1 is a block diagram showing an electric circuit of a distance measuring device embodying the present invention.
Figure 3:
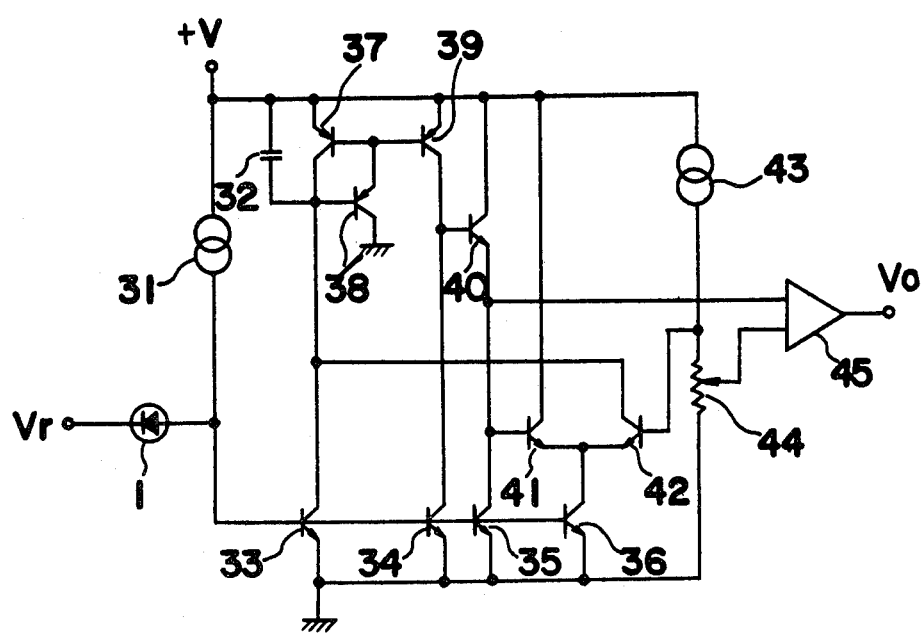
FIG. 3 is a circuit diagram showing the details of each of the light measuring circuits employed in the distance measuring device shown in FIG. 1.

Referring first to FIG. 1, the automatic distance measuring device shown therein comprises a plurality of, for example, four, photoresponsive elements $1a$, $1b$, $1c$ and $1d$ connected at one end to a constant voltage source Vr and at the other end to respective light measuring circuits $2a$, $2b$, $2c$ and $2d$, the details of each of said light measuring circuits $2a$ to $2d$ being shown in FIG. 3. These light measuring circuits $2a$ to $2d$ are electrically connected to a logic circuit 14 through respective latching D flip-flops $3a$, $3b$, $3c$ and $3d$. Each latching D flip-flop $3a$, $3b$, $3c$ or $3d$ has an input terminal D, connected to the corresponding light measuring circuit $2a$, $2b$, $2c$ or $2d$ and a timing terminal T connected to a one-shot circuit 8 and is operable to store and subsequently output an input signal applied to the input terminal D from the corresponding light measuring circuit $2a$, $2b$, $2c$ or $2d$ in response to a voltage increase of the pulse of a predetermined pulse width applied to the timing terminal T.

The one-shot circuit 8 is electrically connected in parallel to another one-shot circuit 9, both having an input terminal connected to an output terminal of an AND gate 7 and being capable of generating a pulse of a predetermined pulse width in response to a voltage increase of a pulse generated from the AND gate 7. However, the pulse width of the pulse generated from the one-shot circuit 8 is selected to be smaller than that from the one-shot circuit 9. The output terminal of the one-shot circuit 8 is connected to the timing terminals T of the flip-flops 3a to 3d, and the output terminal of the one-shot circuit 9 is connected to a light emitting element 11 through a drive circuit 10 operable to energize the light emitting element 11 in response to an output pulse applied from the one-shot circuit 9.

The AND gate 7 has a pair of input terminals, one being connected to a delay circuit 6 and the other being connected in shunt to a source +V of electric power through a switch 5 and to the ground through a suitable resistor. Connected to an input terminal of the delay circuit 6 is a series circuit including a switch 4 and a suitable resistor, said series circuit having one end connected to the power source +V and the other end grounded with the junction between the switch 4 and the resistor being connected to the delay circuit 6. It is to be noted that the switch 4 is adapted to be closed when a push-button (not shown) is manually depressed, said push-button being understood as operatively associated with an objective lens unit (not shown) in such a manner that, when said push-button is depressed, the objective lens unit which has been held at a start position on the opposite side of the position corresponding to the smallest possible focal distance starts its movement towards the position for infinity focusing. It is also to be noted that the switch 5 is adapted to be closed when the picture taking lens unit reaches the position corresponding to the smallest possible distance.

The delay circuit 6 is so designed as to generate a high level output signal after a predetermined delay time subsequent to the closure of the switch 4, said predetermined delay time corresponding to the time required for the electric circuit components, particularly, the light measuring circuits 2a to 2d, to reach operation at a stable condition subsequent to the start of supply of the electric power thereto.

Figure 4:
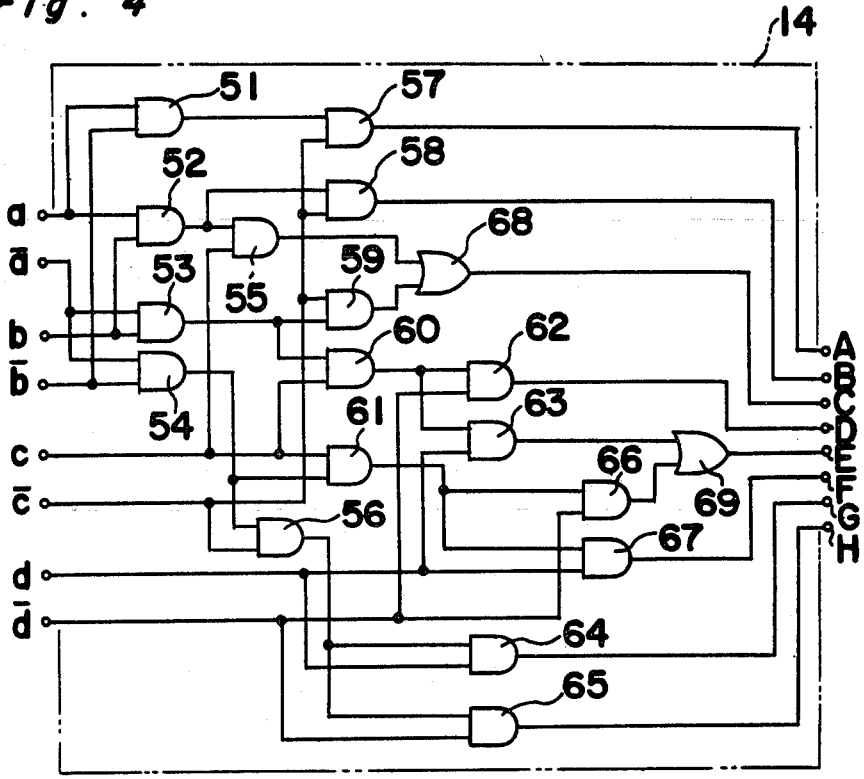
FIG. 4 is a circuit diagram showing the details of a logic circuit according to one preferred embodiment of the present invention.

The logic circuit 14, the details of which are shown in FIG. 4 and forming the subject matter of the present invention, has a plurality of output terminals A, B, C, D, E, F, G and H which are connected to respective input terminals of an output control circuit 15 which is in turn connected to a distance display circuit 16. Of the eight output terminals of the logic circuit 14, the output terminals A to G are also connected respectively to the emitters of corresponding transistors 17A, 17B, 17C, 17D, 17E, 17F and 17G having their bases connected together and in turn to an RS flip-flop 12 and their collectors connected respectively to fixed contacts 18A, 18B, 18C, 18D, 18E, 18F and 18G.

The RS flip-flop 12 has Q and $\overline{Q}$ output terminals respectively connected to a control terminal of the output control circuit 15 and to the bases of the transistors 17A to 17G through a suitable common resistor. This flip-flop 12 is so designed as to be reset in response to the closure of the switch 4 and to be set in response to the voltage drop of the pulse applied thereto from the one-shot circuit 8.

A common fixed contact 20, forming a position detector together with the fixed contacts 18A to 18G for providing an electric signal indicative of the position of the picture taking lens unit along its stroke of movement, is positioned parallel with the row of the equally spaced fixed contacts 18A to 18G and is adapted to be electrically connected to a selected one of the fixed contacts 18A to 18G by means of a movable bridge member 19 movable together with the picture taking lens unit. This common fixed contact 20 is connected through a suitable resistor to the base of a transistor 21 and also to the ground through a suitable resistor, said transistor 21 having its emitter connected to the ground through a suitable resistor and its collector connected to an electromagnetic unit 22. The electromagnetic unit 22 is a type having its core constituted by a permanent magnet and is operatively associated with a stop element operable to arrest the picture taking lens unit at a definite position when the electromagnetic unit 22 is energized. For energizing the electromagnetic unit 22, a capacitor 23 is connected in parallel to the transistor 21 and the electromagnetic unit 22 so that, when the transistor 21 is brought into a conductive state, the electric potential charged on the capacitor 23 is discharged through the electromagnetic unit 22 to energize the latter.

The output control circuit 15 is constituted by eight AND gates each being of a type having a pair of input terminals, one of the input terminals of each of the AND gates of the output control circuit 15 being connected to the corresponding output terminal A, B, C, D, E, F, G or H of the logic circuit 14 while the other of the input terminals of each of the AND gates of the output control circuit 15 is connected to the Q output terminal of the flip-flop 12.

As will be clear from the subsequent description, the logic circuit 14 has input terminals connected to the flip-flops 3a to 3d so as to receive output signals a, $\overline{a}$, b, $\overline{b}$, c, $\overline{c}$, d and $\overline{d}$ applied therefrom and is so designed as to generate a high level output signal through only one of the output terminals A to H.

Figure 2:
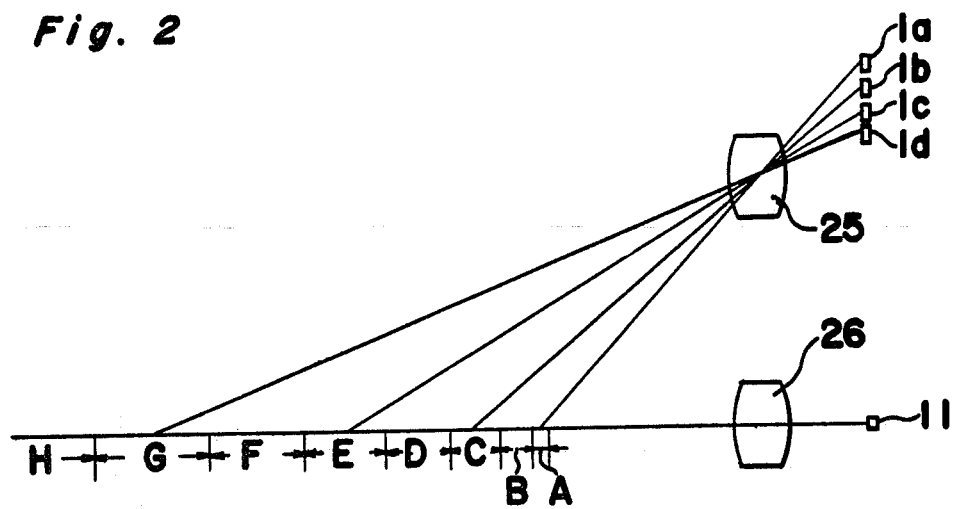
FIG. 2 is a diagram showing the principle of the distance measurement employed in the device of the present invention.

Referring now to FIG. 2, the light receiver constituted by the photoresponsive elements 1a to 1d is located at a predetermined position offset laterally relative to the light emitting element 11. While a series of zones A, B, C, D, E, F, G and H at different distances relative to the rangefinder or distance measuring device are defined on the path of travel of the pulsating light beam emitted by the light emitting element 11 and passing through a lens element 26, the light receiver is so arranged relative to the light emitting element 11 as to enable the photoresponsive elements 1a to 1d to monitor the zones A, C, E and G, respectively, through a lens element 25. In other words, the photoresponsive elements 1a to 1d are so arranged as to have the optical axes thereof passing through the common lens element 25 intersect with the path of travel of the pulsating light beam from the light emitting element 11 in respective zones A, C, E and G.

From the foregoing, it will readily be seen that:

(1) when none of the photoresponsive elements 1a to 1d sense the pulsating light beam emitted by the light emitting element and subsequently reflected from a target object, the target object is indicated as being located within the zone H, that is, at an infinity position away from the distance measuring device;

(2) when the pulsating light beam emitted by the light emitting element 11 and subsequently reflected from a target object (which pulsating light beam is hereinafter referred to as "reflected light") is sensed by the photoresponsive element 1a, the target object is indicated as being located within the zone A;

(3) when the reflected light is sensed by the photoresponsive element 1b, the target object is indicated as being located within the zone C;

(4) when the reflected light is sensed by the photoresponsive element 1c, the target object is indicated as being located within the zone E;

(5) when the reflected light is sensed by the photoresponsive element 1d, the target object is indicated as being located within the zone G;

(6) when the reflected light is sensed simultaneously by the photoresponsive elements 1a and 1b, the target object is indicated as being located within the zone B;

(7) when the reflected light is sensed simultaneously by the photoresponsive elements 1b and 1c, the target object is indicated as being located within the zone D; and (8) when the reflected light is sensed simultaneously by the photoresponsive elements 1c and 1d, the target object is indicated as being located within the zone F.

The conditions (1) to (8) above are tabulated in Table I wherein "0" and "1" under the heading of "Light Receiver" represent the absence and presence, respectively, of the reflected light sensed by any one of the photoresponsive elements 1a to 1d while "0" and "1" under the heading of "Zones" represent the absence and presence, respectively, of the target object.

TABLE I

| Conds. | Light Receiver | | | | Zones | | | | | | | |
|---|---|---|---|---|---|---|---|---|---|---|---|---|
| | 1a | 1b | 1c | 1d | A | B | C | D | E | F | G | H |
| (1) | 0 | 0 | 0 | 0 | 0 | 0 | 0 | 0 | 0 | 0 | 0 | 1 |
| (2) | 1 | 0 | 0 | 0 | 1 | 0 | 0 | 0 | 0 | 0 | 0 | 0 |
| (3) | 0 | 1 | 0 | 0 | 0 | 0 | 1 | 0 | 0 | 0 | 0 | 0 |
| (4) | 0 | 0 | 1 | 0 | 0 | 0 | 0 | 0 | 1 | 0 | 0 | 0 |
| (5) | 0 | 0 | 0 | 1 | 0 | 0 | 0 | 0 | 0 | 0 | 1 | 0 |
| (6) | 1 | 1 | 0 | 0 | 0 | 1 | 0 | 0 | 0 | 0 | 0 | 0 |
| (7) | 0 | 1 | 1 | 0 | 0 | 0 | 0 | 1 | 0 | 0 | 0 | 0 |
| (8) | 0 | 0 | 1 | 1 | 0 | 0 | 0 | 0 | 0 | 1 | 0 | 0 |
| (9) | 1 | 1 | 1 | 0 | 0 | 0 | 1 | 0 | 0 | 0 | 0 | 0 |
| (10) | 0 | 1 | 1 | 1 | 0 | 0 | 0 | 0 | 1 | 0 | 0 | 0 |

It is to be noted that there may be the possibility that three of the photoresponsive elements 1a to 1d will simultaneously sense the reflected light if the photoresponsive elements 1a to 1d are incorrectly mounted relative to each other and/or if the light receiver and the light emitting element 11 are not accurately positioned relative to each other. In such case, particularly, when the photoresponsive elements 1a, 1b and 1c simultaneously sense the reflected light, the condition (9) may be established showing that the target object is indicated as located within the zone G whereas, when the photoresponsive elements 1b, 1c and 1d simultaneously sense the reflected light, the condition (10) may be established showing that the target object is indicated as located within the zone E.

In addition, it is to be noted that the presence and absence of the reflected light sensed by any one of the photoresponsive elements 1a to 1d, which are respectively shown by "1" and "0" in Table I (and also in the subsequent tables) can be construed as meaning a high level signal and a low level signal generated by the corresponding photoresponsive elements 1a to 1d.

The light measuring circuits 2a to 2d respectively coupled to the photoresponsive elements 1a to 1d cause the following problem when operated under a condition wherein the target object is illuminated by either or both incandescent and fluorescent lamps operating on alternating current. This will now be described with particular reference to FIG. 3 showing the details of each of the light measuring circuits 2a to 2d and in which any one of the photoresponsive elements which have been designated 1a to 1d, respectively, in FIGS. 1 and 2 is indicated generally by 1.

Referring to FIG. 3, in addition to the photoresponsive element 1, the light measuring circuit includes a constant current source 31 for providing a biasing voltage to transistors 33 to 36, a delay capacitor 32, a constant current source 43 for providing a constant voltage and a variable resistor 44 for adjusting the voltage to be supplied to an inverting input terminal of a comparator 45. In this circuit shown in FIG. 3, when and so long as the photoresponsive element 1 receives the reflected light emitted by the light emitting element 11, a feedback loop including transistors 38, 37, 39, 40, 41 and 42 is established and, therefore, the base potentials of the respective transistors 41 and 42 are equal to each other with the comparator 45 consequently generating an output which is a low level signal. If the capacitor 32 is a type having a relatively low capacitance, the feedback loop can also be established, even where ambient light such as emitted by the incandescent and/or fluorescent lamps gently varies, to make the base potentials of the respective transistors 41 and 42 equal to each other hand, therefore, there is no possibility that the output Vo of the comparator 45 will be changed to a high level.

Furthermore, even when variation of the ambient light takes place rapidly or in the case where the feedback loop cannot readily be established, the feed-back loop can be established prior to the occurrence of an unbalanced condition of the circuit and, therefore, there is no possibility that the output Vo of the comparator 45 will be changed to a high level if the adjustable resistor 44 is so adjusted to make the electric potential applied to one of the two inputs of the comparator 45 different from that applied to the other of the inputs of the same comparator 45.

However, when the photoresponsive element 1 senses reflected light which varies rapidly, the capacitor 32 hampers the establishment of the feed-back loop (including the transistors 38, 37, 39, 40, 41 and 42) which readily cope with such rapid variation in the reflected light and, therefore, the circuit loses its equilibrium to such an extent that the output Vo from the comparator 45 is changed to a high level.

Where the distance measuring device or rangefinder employs light measuring circuits each having the construction described with reference to and shown in FIG. 3, the following problem will occur.

As is well known to those skilled in the art, the farther the distance from the rangefinder to the target object, the lower the intensity of light reflected from the target object. Therefore, the photoresponsive element 1d assigned to monitor the zone G next to the farthest zone H on the path of travel of the pulsating light emitted by the light emitting element 11 tends to receive reflected light of a lower intensity than that received by any one of the other photoresponsive elements 1a, 1b and 1c, the reflected light from the target object in the zone G being of a type having its pulse voltage increase taking place slowly.

In order to make the reflected light, that is, the pulsating light beam reflected from the target object, a type having a slow voltage increase set-up portion as described above to be detected by the corresponding light measuring circuit $2d$, alternative countermeasures are possible. One is to utilize a capacitor 32 of a type having a higher capacitance than that employed in any one of the light measuring circuits $2a$, $2b$ and $2c$ and the other is to make the potential difference between the inputs of the comparator 45 in the light measuring circuit $2d$ smaller than that in any one of the light measuring circuits $2a$, $2b$ and $2c$.

If any one of these alternative countermeasures is employed in practice, an adverse effect will occur. Namely, since the ambient light such as emitted by incandescent and/or fluorescent lamps operating on alternating current contains a pulsating component of a frequency equal to the frequency of the alternating current and is, brighter than the pulsating light beam emitted by the light emitting element 11, the light measuring circuit $2d$ tends to respond to such ambient light, thereby causing the comparator 45 to generate a high level signal. This is particularly true when the frequency of the pulsating component of the ambient light is high.

In order to avoid the above described problem, the present invention provides a logic circuit 14 operable to determine the applicability of the high level output signal from the light measuring circuit $2d$ by a binary-coded combination of respective output signals from the light measuring circuits $2a$, $2b$ and $2c$.

The following Table II shows a correlation similar to that represented by Table I, but for the light receiver receiving the reflected light as well as the ambient light. It is to be noted that the target object conditions (1') to (10') in Table II correspond respectively to the conditions (1) to (10) in Table I.

TABLE II

| Conds. | Light Receiver | | | | Zones | | | | | | | |
|---|---|---|---|---|---|---|---|---|---|---|---|---|
| | 1a | 1b | 1c | 1d | A | B | C | D | E | F | G | H |
| (1') | 0 | 0 | 0 | 1 | 0 | 0 | 0 | 0 | 0 | 0 | 1 | 0 |
| (2') | 1 | 0 | 0 | 1 | 1 | 0 | 0 | 0 | 0 | 0 | 0 | 0 |
| (3') | 0 | 1 | 0 | 1 | 0 | 0 | 1 | 0 | 0 | 0 | 0 | 0 |
| (4') | 0 | 0 | 1 | 1 | 0 | 0 | 0 | 0 | 1 | 0 | 0 | 0 |
| (5') | 0 | 0 | 0 | 1 | 0 | 0 | 0 | 0 | 0 | 1 | 0 | 0 |
| (6') | 1 | 1 | 0 | 1 | 0 | 1 | 0 | 0 | 0 | 0 | 0 | 0 |
| (7') | 0 | 1 | 1 | 1 | 0 | 0 | 0 | 1 | 0 | 0 | 0 | 0 |
| (8') | 0 | 0 | 1 | 1 | 0 | 0 | 0 | 0 | 1 | 0 | 0 | 0 |
| (9') | 1 | 1 | 1 | 1 | 0 | 0 | 1 | 0 | 0 | 0 | 0 | 0 |
| (10') | 0 | 1 | 1 | 1 | 0 | 0 | 0 | 0 | 1 | 0 | 0 | 0 |

It is to be noted that the presence or absence of the target object in a particular zone which is shown respectively by "1" and "0" in Table II can be construed as being indicated by a high level output signal or a low level output signal generated through the corresponding output terminals of the logic circuit 14 shown in FIG. 1.

Although the condition (1') corresponds to the condition (1), the binary-coded representation of the outputs from the photoresponsive elements $1a$ to $1d$ in Table II is similar to that during the condition (5) in Table I and, therefore, the logic circuit 14 generates a combination of high and low level output signals in a manner similar to that indicating the condition (5) rather than the condition (1). On the other hand, the respective binary-coded representations of the outputs from the photoresponsive elements $1a$ to $1d$ for the conditions (2'), (3'), (6') and (9') in Table II are different from those for the corresponding conditions (2), (3), (6) and (9) in Table I because the output signal from the photoresponsive element $1d$ is an erroneous indication of a target object but the logic circuit 14 generates a combination of high and low level output signals in a manner similar to that during the conditions (2), (3), (6) and (9). However, while the condition (4') corresponds to the condition (4), the binary-coded representation of the outputs from the photoresponsive elements $1a$ to $1d$ is similar to that for the condition (8) and, therefore, the logic circuit 14 generates a combination of high and low level output signals erroneously indicating the condition (8).

The condition (5') corresponds the condition (5) and the binary-coded representation of the outputs from the photoresponsive elements $1a$ to $1d$ remains the same as that during the condition (5). In addition, although the condition (7') corresponds to the condition (7), the binary-coded representation of the outputs from the photoresponsive elements $1a$ to $1d$ is similar to that during the condition (10) and, therefore, the logic circuit 14 generates a combination of high and low level output signals erroneously indicating the condition (10). The conditions (8') and (10') correspond respectively to the conditions (8) and (10), and the binary-coded representations of the outputs from the photoresponsive elements $1a$ to $1d$ remain the same as that during the conditions (8) and (10), respectively.

From the foregoing, it will readily be seen those the generation of an erroneous distance signal due to the generation of the high level output signal from the light measuring circuit $2d$ takes place during each of the conditions (1'), (4') and (7'). However, the erroneous distance signal is for a displaced zone one zone from the correct zone and, when the light measuring circuit $2d$ has responded to the pulsating component of the ambient light emitted by incandescent and/or fluorescent lamps operating on alternating current, this means that the intensity of illumination falling on the target object is sufficiently high. Accordingly, if this type of rangefinder is incorporated in a photographic camera, there will be no practical problems since the lens aperture can be stopped down to provide a relatively large depth of field to such an extent that there is no substantial out-of-focus relative to the target object located in a particular zone.

The following logic formulas concerning the relationship between the output signals from the photoresponsive elements $1a$ to $1d$ and the zones A to H can be obtained according to Tables I and II.

$$A = a \cdot \bar{b} \cdot \bar{c} \tag{I}$$

$$B = a \cdot b \cdot \bar{c} \tag{II}$$

$$C = \bar{a} \cdot b \cdot \bar{c} + a \cdot b \cdot c \tag{III}$$

$$D = \bar{a} \cdot b \cdot c \cdot \bar{d} \tag{IV}$$

$$E = \bar{a} \cdot \bar{b} \cdot c \cdot \bar{d} + \bar{a} \cdot b \cdot c \cdot d \tag{V}$$

$$F = \bar{a} \cdot \bar{b} \cdot c \cdot d \tag{VI}$$

$$G = \bar{a} \cdot \bar{b} \cdot \bar{c} \cdot d \tag{VII}$$

$$H = \bar{a} \cdot \bar{b} \cdot \bar{c} \cdot \bar{d} \tag{VIII}$$

wherein the period (·) between each adjacent two of the characters represents a logical product, + represents the logical sum and the line drawn above the character represents a negative sign.

FIG. 4 illustrates the details of the logic circuit 14 designed on the basis of the foregoing formula (I) to (VIII) and utilizing a plurality of AND gates 51 to 67, each being a type having a pair of input terminals, and two OR gates 68 and 69 each being a type having a pair of input terminals.

The formula (I) can be established when the AND gate 51 is enabled by signals respectively fed from terminals a and $\bar{b}$ of the associated flip-flops 3a and 3b and the AND gate 57 is subsequently opened by signals fed respectively from the AND gate 51 and a terminal $\bar{c}$ of the flip-flop 3c.

The formula (II) can be established when the AND gate 52 is opened by signals respectively fed from terminals a and b of the associated flip-flops 3a and 3b and the AND gate 58 is subsequently opened by signals fed respectively from the AND gate 52 and the terminal $\bar{c}$ of the flip-flop 3c.

The formula (III) can be established when the AND gate 55 is opened by signals applied respectively from the terminals a and b of the associated flip-flops 3a and 3b, the AND gate 53 is then opened by signals applied respectively from the AND gate 52 and a terminal c of the flip-flop 3c, the AND gate 59 is opened by signals applied respectively from the AND gate 53 and the terminal $\bar{c}$ of the flip-flop 3c and finally the OR gate 68 is opened by signals respectively fed from the gates 55 and 59.

The formula (IV) can be established when the AND gate 53 is opened by signals respectively applied from the terminals $\bar{a}$ and b of the associated flip-flops 3a and 3b, the AND gate 50 is subsequently opened by signals fed respectively from the AND gate 53 and the terminal c of the flip-flop 3c and the AND gate 62 is finally opened by signals fed respectively from the AND gate 60 and a terminal $\bar{d}$ of the flip-flop 3d.

The formula (V) can be established when the AND gate 53 is opened by signals fed respectively from the terminals $\bar{a}$ and b of the associated flip-flops 3a and 3b, the AND gate 60 is subsequently opened by signals fed respectively from the AND gate 53 and the terminal c of the flip-flop 3c, the AND gate 54 is opened by signals fed respectively from the terminals $\bar{a}$ and $\bar{b}$ of the associated flip-flops 3a and 3b, the AND gate 61 is opened by signals fed respectively from the AND gate 54 and the terminal c of the flip-flop 3c, the AND gate 66 is opened by signals fed respectively from the AND gate 61 and the terminal $\bar{d}$ of the flip-flop 3d and, finally, the OR gate 69 is opened by signals fed respectively from the AND gates 63 and 66.

The formula (VI) can be established when the AND gate 54 is opened by signals fed respectively from the terminals $\bar{a}$ and $\bar{b}$ of the associated flip-flops 3a and 3b, the AND gate 61 is opened by signals fed respectively from the AND gate 54 and the terminal c of the flip-flop 3c and the AND gate 67 is opened by signals respectively from the AND gate 54 and the terminal d of the flip-flop 3d.

The formula (VII) can be established when the AND gate 54 is opened by signals fed respectively from the terminals $\bar{a}$ and $\bar{b}$ of the associated flip-flops 3a and 3b, the AND gate 56 is opened by signals fed respectively from the AND gate 54 and the terminal $\bar{c}$ of the flip-flop 3c and the AND gate 64 is finally opened by signals from the AND gate 56 and the terminal of the flip-flop 3d.

The formula (VIII) can be established when the AND gate 54 is opened by signals fed respectively from the terminals $\bar{a}$ and $\bar{b}$ of the associated flip-flops 3a and 3b, the AND gate 56 is opened by signals respectively from the AND gate 54 and the terminal $\bar{c}$ of the flip-flop 3c and the AND gate 65 is finally opened by signals fed respectively from the AND gate 56 and the terminal $\bar{d}$ of the flip-flop 3d.

The operation of the rangefinder or distance measuring device embodying the present invention will now be described.

When the switch 4 is closed, the supply of an electric power to the other circuit components of the rangefinder is initiated and the picture taking lens unit (not shown) is moved towards the position for infinity focusing from the start position. Simultaneously therewith, opposite to the hyperfocal position. Simultaneously therewith, the flip-flop 12 is set and the delay circuit 6 starts its counting operation to count the delay time. At this time, the movable bridge member 19 has not yet moved to a position to connect any one of the fixed contacts 18A to 18G to the common fixed contact 20.

After a delay time determined by the delay circuit 6 has passed, the delay circuit 6 generates a high level signal and, when the picture taking lens unit reaches the position corresponding to the smallest possible focal distance, the switch 5 is closed, whereby the AND gate 7 generates a high level signal which is in turn parallel to the one-shot circuits 8 and 9 to cause the latter to generate output pulses of individually predetermined pulse widths.

The output pulse from the one-shot circuit 9 is fed to the drive circuit 10 to energize the light emitting element 11. It is to be noted that the output pulse from the one-shot circuit 8 terminates during the emission of light from the light emitting element 11 which takes place in response to the output pulse from the one-shot circuit 9 as hereinbefore described. Output signals from the respective light measuring circuits 2a to 2d associated with the photoresponsive elements 1a to 1d, some of said photoresponsive elements 1a to 1d having received the pulsating light which has been emitted by the light emitting element 11 and subsequently reflected from the target object within one particular zone, are stored after the D inputs of the D-flip-flops have been outputted in response to the voltage drop of the output pulse from the one-shot circuit 8.

On the other hand, in response to the voltage drop of the output pulse from the one-shot circuit 8, the RS flip-flop 12 is set and, accordingly, the transistors 17A to 17G are brought into their conductive states while the output control circuit 15 is held in condition to allow the passage of the output signals from the logic circuit 14 therethrough to the distance display circuit 16 to visually represent the zonal distance from the rangefinder to the target object in that particular zone.

When the picture taking lens unit reaches the position corresponding to the smallest possible focal distance, the movable bridge member 19 having one end constantly held in sliding engagement with the common fixed contact 20 starts sweeping the row of the fixed contacts 18A to 18G. By way of example, if the output terminal E of the logic circuit 14 is in a high level state, only the transistor 17E is brought into a conductive state, and when the movable bridge member 19 is in a position to connect the fixed contact 18E to the fixed contact 20 therethrough, this will cause the transistor 21 to conduct. When the transistor 21 becomes conductive, the electric potential charged on the capacitor 23 is discharged through the electromagnetic unit 22 to cause the stop element to arrest the picture taking lens unit at the position corresponding to the focal distance to the zone E.

If the target object is located in the farthest zone H, the picture taking lens unit is moved to the position for infinity focusing. In order to arrest the picture taking lens unit at the that position, a stop may be provided to arrest it.

Figure 5:
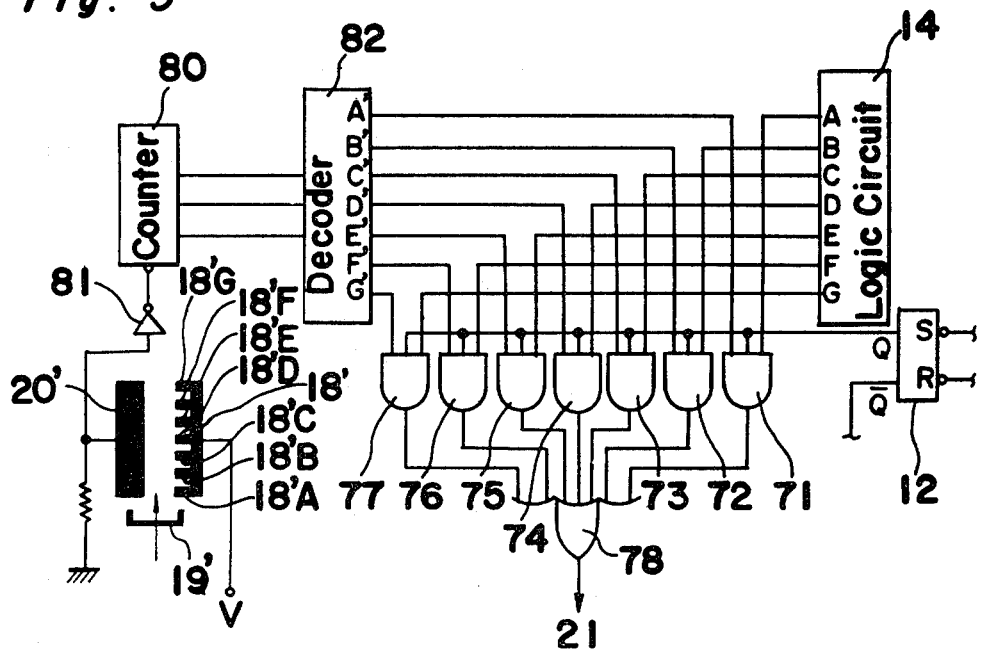
FIG. 5 is a circuit diagram showing a portion of the circuit shown in FIG. 1, showing another preferred embodiment of the present invention.

The control circuit for controlling the electromagnetic unit 22 which has been described and shown in FIG. 1 as constituted by the transistors 17A to 17G and its associated position detector may be modified in the manner as shown in FIG. 5. It is to be noted that like parts in FIG. 5 are designated by like reference numerals employed in FIG. 1.

Referring to FIG. 5, the position detector comprises a movable bridge member 19', an elongated fixed contact 20' electrically connected to an inverter 81 and also to the ground through a suitable resistor, and a generally comb-shaped fixed contact 18 having contact pieces 18'A, 18'B, 18'C, 18'D, 18'E, 18'F and 18'G arranged in a row parallel to the longitudinal axis of the elongated fixed contact 20', said elongated fixed contact 20' being connected to a source V of electric power. This position detector is so designed that when the picture taking lens unit reaches the position corresponding to the smallest possible focal distance, the movable bridge member 19' is brought into a position to connect the fixed contact 20' to the contact piece 18'A and, as the picture taking lens unit moves towards the position for infinity focusing, the fixed contact 20' is selectively electrically connected to the other contact pieces 18'B to 18'G through the movable bridge member 19'.

The inverter 81 is connected to a 3-bit counter 80 capable of storing up to 8 counts and capable of counting each pulse in response to the voltage drop of an output signal from the inverter 81. This counter 80 is connected to a decoder 82 having a plurality of output terminals A', B', C', D', E', F' and G'. This decoder 82 is so designed that when the counter 80 generates an output signal representative of a binary-coded number "001", the terminal A' is held in a high level state; when the counter 80 generates an output signal representative of a binary-coded number "010", the terminal B' is held in a high level state; and, in a similar manner, when the counter 80 generates an output signal representative of a binary-coded number "111", the terminal G' is held in a high level state.

The control circuit comprises a plurality of AND gates 71, 72, 73, 74, 75, 76 and 77 each having three input terminals. As shown, the first input terminals of the corresponding AND gates 71 to 77 are connected respectively to the output terminals A to G of the logic circuit 14; the second input terminals of the corresponding AND gates 71 to 77 are connected in common to the Q output of the RS flip-flop 12; and the third input terminals of the corresponding AND gates 71 to 77 are connected respectively to the output terminals A' to G' of decoder 82. These AND gates 71 to 77 have their respective output terminals connected to an OR gate 78 which is in turn connected to the transistor 21 (FIG. 1).

The circuit shown in FIG. 5 operates in the following manner.

Assuming that the flip-flop 12 is set and, therefore, the Q output is in a high level state, the AND gates 71 to 77 are supplied with output Q. If the output terminal E of the logic circuit 14 is held at a high level state at this time, the movable bridge member 19' is, in unison with the movement of the picture taking lens unit, moved to a position where the fixed contact 20' is electrically connected through the movable bridge member 19' to the contact piece 18'E of the comb-shaped contact 18' which corresponds to the zone E. Since the electric connection between the elongated contact 20' and the comb-shaped 18' has taken place five times during the movement of the bridge member 19' to that position where the contact 20' is connected to the contact piece 18'E, the position detector generates five output pulses which are fed through the inverter 81 to the counter 80. Accordingly, the counter 80 generates an output signal representative of a binary coded number of "101" and the output terminal E' of the decoder 82 is consequently held in a high level stae. Therefore, only the AND gate 75 receives the high level input signals, whereby the output of said AND gate 75 is at a high level state and the output of the OR gate 78 consequently being at a high level state. Upon generation of the high level output signal from the OR gate 78 in the manner described above, the electromagnetic unit 22 is energized in the manner described with reference to FIG. 1 and, therefore, the picture taking lens unit is arrested at one of the focal positions corresponding to the zone E.

Although the present invention has fully been described by way of example with reference to the accompanying drawings, it is to be noted that various changes and modifications will be to those skilled in the art. By way of example, the logic circuit 14 may be modified to operate according to the following table.

It is to be noted that Table III is for conditions similar to that represented by Table II.

TABLE III

| Conds. | Light Receiver | | | | Zones | | | | | | | |
|---|---|---|---|---|---|---|---|---|---|---|---|---|
|  | 1a | 1b | 1c | 1d | A | B | C | D | E | F | G | H |
| (1') | 0 | 0 | 0 | 1 | 0 | 0 | 0 | 0 | 0 | 0 | 1 | 0 |
| (2') | 1 | 0 | 0 | 1 | 0 | 0 | 0 | 0 | 0 | 0 | 1 | 0 |
| (3') | 0 | 1 | 0 | 1 | 0 | 0 | 0 | 0 | 0 | 0 | 1 | 0 |
| (4') | 0 | 0 | 1 | 1 | 0 | 0 | 0 | 0 | 0 | 1 | 0 | 0 |
| (5') | 0 | 0 | 0 | 1 | 0 | 0 | 0 | 0 | 0 | 1 | 0 | 0 |
| (6') | 1 | 1 | 0 | 1 | 0 | 0 | 0 | 0 | 0 | 0 | 1 | 0 |
| (7') | 0 | 1 | 1 | 1 | 0 | 0 | 0 | 0 | 1 | 0 | 0 | 0 |
| (8') | 0 | 0 | 1 | 1 | 0 | 0 | 0 | 0 | 1 | 0 | 0 | 0 |
| (9') | 1 | 1 | 1 | 1 | 0 | 0 | 0 | 0 | 0 | 0 | 1 | 0 |
| (10') | 0 | 1 | 1 | 1 | 0 | 0 | 0 | 1 | 0 | 0 | 0 | 0 |

Comparison of the Table III with the Table II will show that the binary-coded representations during the conditions (1'), (4'), (5'), (7'), (8') and (10') in Table III are identical with that in Table II. However, it should be noted that zone G is always designated when any two of the photoresponsive elements 1a to 1d which are not adjacent to each other simultaneously generate high level output signals, such as occurs during any one of the conditions (2'), (3'), (6') or when all of the photoresponsive elements generate high level output signals as in condition (9') in Table III.

The relationship between the conditions of photoresponsive elements 1a, 1b, 1c and 1d and the zones A to H in Tables I and III are summarized by the following logic formulas:

$$A = a \cdot \bar{b} \cdot \bar{c} \cdot \bar{d}$$

$$B = a \cdot b \cdot \bar{c} \cdot \bar{d}$$

$$C = b \cdot \bar{d}(\bar{a} \cdot c + a \cdot c)$$

$$D = \bar{a} \cdot b \cdot c \cdot \bar{d}$$

$$E = \bar{a} \cdot c \cdot (\bar{b} \cdot \bar{d} + b \cdot d)$$

$$F = \bar{a} \cdot \bar{b} \cdot c \cdot d$$

$$G = \bar{a} \cdot \bar{b} \cdot \bar{c} \cdot d + IR,$$

$$H = \bar{a} \cdot \bar{b} \cdot \bar{c} \cdot \bar{d}$$

wherein:

$IR_1 = a \cdot \bar{b} \cdot \bar{c} \cdot d$     condition (2')

$IR_2 = \bar{a} \cdot b \cdot \bar{c} \cdot d$     condition (3')

$IR_3 = a \cdot b \cdot \bar{c} \cdot d$     condition (6')

$IR_4 = a \cdot b \cdot c \cdot d$     condition (9')

$$IR = IR_1 + IR_2 + IR_3 + IR_4$$
$$= (a \cdot \bar{b} + \bar{a} \cdot b) \cdot \bar{c} \cdot d + a \cdot b \cdot d$$

Figure 6:
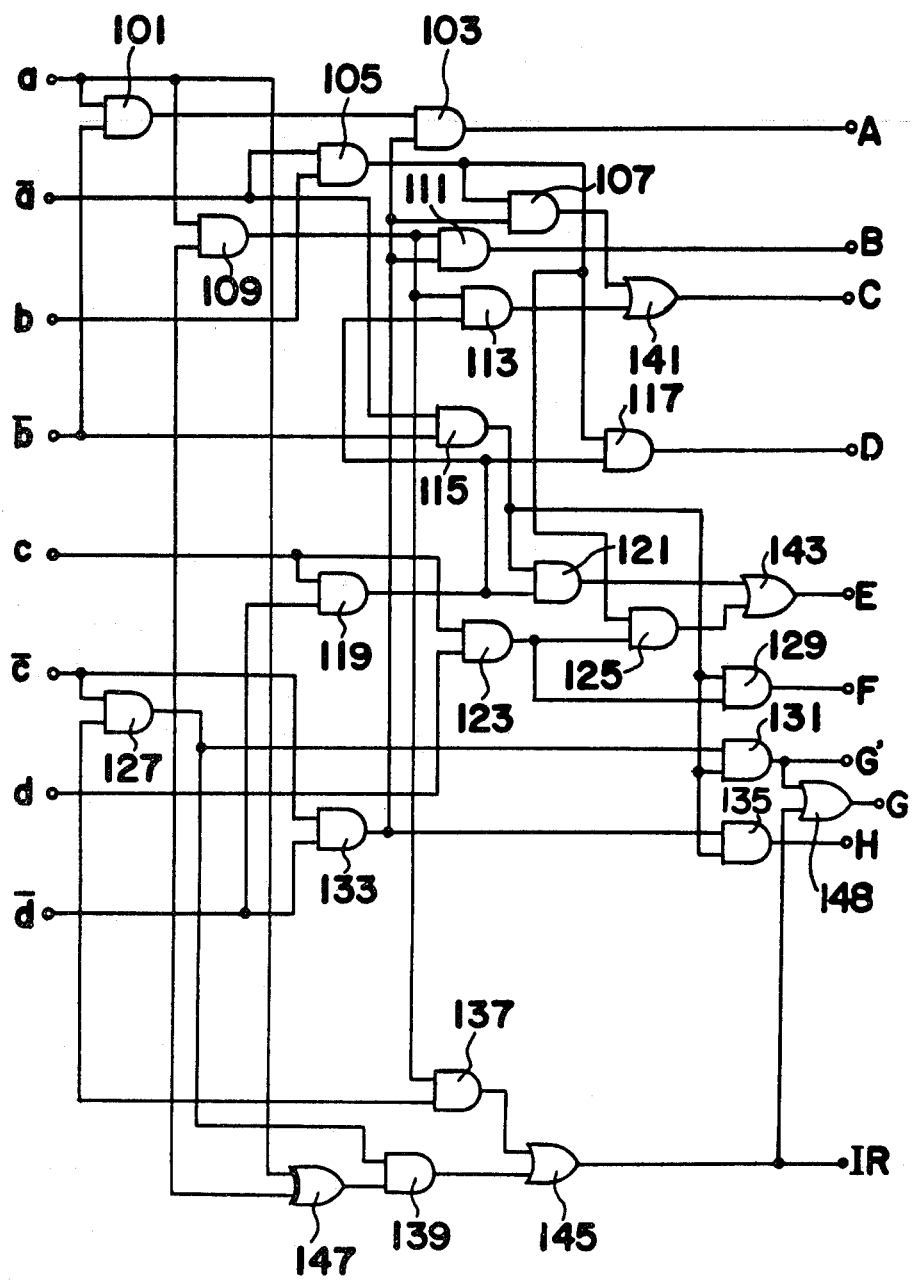
FIG. 6 is a diagram similar to FIG. 4, showing a further embodiment of the present invention.

The logic circuit operable on the basis of the foregoing formulas is shown in FIG. 6. It is to be noted that an output terminal IR in the logic circuit shown in FIG. 6 is utilized to separate the abnormal conditions (2'), (3'), (6') and (9') from the conditions (5), (1') and (5'). This is for providing a warning of the abnormal conditions (2'), (3'), (6') and (9') by the output from terminal IR.

In FIG. 6, reference numerals 101, 103, 105, 107, 109, 111, 113, 115, 117, 117, 119, 121, 123, 125, 127, 129, 131, 133, 135, 137 and 139 represent AND gates, reference numerals 141, 143, 145 and 148 represent OR gates and reference numeral 147 represents an exclusive OR gate.

However, there may be the possibility that the photoresponsive elements 1a to 1d detect the reflected light as well as the ambient light and generate the following binary signals.

| 1a | 1b | 1c | 1d |       |
|----|----|----|----|-------|
| 1  | 0  | 1  | 0  | ...IR$_5$ |
| 1  | 0  | 1  | 1  | ...IR$_6$ |

This is particularly true when the light measuring circuits 2a to 2d are of uniform sensitivity, that is, are not adjusted to have different sensitivities. Or, the above binary signal IR$_5$ or IR$_6$ may occur depending upon the type of the pattern of the target object to which the pulsating light beam is directed from the light emitting element 11. In this case, $IR' = IR + IR_5 + IR_6$ and, therefore;

$$IR' = (a \cdot \bar{b} + \bar{a} \cdot b) \cdot \bar{c} \cdot d + a \cdot b \cdot d + a \cdot \bar{b} \cdot c$$

Figure 7:
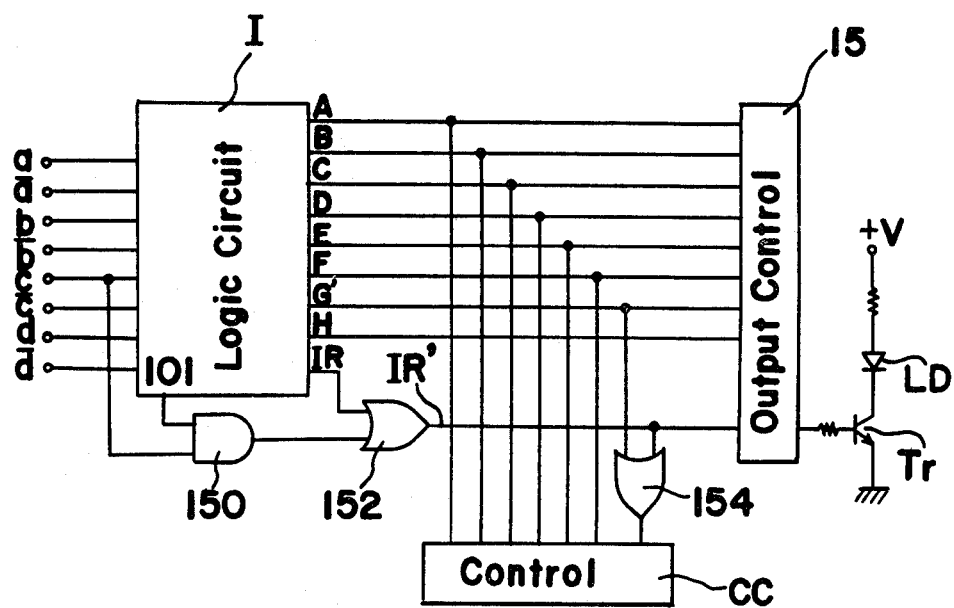
FIG. 7 is a diagram similar to FIG. 5, showing a modification of the circuit of FIG. 5.

By adding an AND gate 150 and an OR gate 152 to the logic circuit of the circuit shown in FIG. 6 in the manner as shown in FIG. 7, the output signal represented by IR' can be obtained. Referring to FIG. 7, two input terminals of the AND gate 150 are respectively connected to the AND gate 101 and the terminal c of the flip-flop 3c while the OR gate 152 has its input terminals connected respectively to the terminal IR of the logic circuit shown in FIG. 6 and the AND gate 150.

In the arrangement shown in FIG. 7, in the case of the signal which is not normal, the output signal from the terminal G' and the signal representing IR' are adapted to be inputted to an OR gate 154 which is in turn connected to the control circuit for the electromagnetic unit 22, so that the picture taking lens unit can be brought to one of the focal positions which is frequently utilized, for example, which correspond to the zone G, and which may be a pan-focal position. The control circuit for the electromagnetic unit 22, shown by CC in FIG. 7, can be identical with that shown in either FIG. 1 or FIG. 5 and it will, therefore, be clear that the output terminal of the OR gate 154 is connected to the emitter of the transistor 17G in FIG. 1 or to the AND gate 77 in FIG. 5.

Furthermore, as shown in FIG. 7, either instead of or together with the employment of the distance display circuit 16 shown in FIG. 1, the distance measuring device may further include a warning circuit including series-connected transistor Tr and a light emitting diode LD for warning, when the light emitting diode LD is ignited in response to the high level signal at IR' terminal, that the detected signal is not normal.

Accordingly, these and other changes and modifications are to be construed as being included within the true scope of the present invention unless they depart therefrom.

We claim:

1. A distance measuring device which comprises:
means for directing a beam of light towards a target object;
means for receiving the beam of light reflected by the target object, said receiving means having a plurality of at least three light sensing portions, the optical axes of which intersect the path of travel of said beam of light in different ranges of distance from said directing means;
means responsive to said receiving means for signaling whether conditions of the respective light sensing portions are light sensing or non-light sensing;
means for determining a target object distance in response to said signaling means;
first means responsive to said signaling means for detecting when the light sensing portions, the optical axes of which intersect the path of travel of the beam of light in non-neighboring ranges of distance, are in the light receiving condition; and
means connected to said first means for producing an output in response to the detection by said first detecting means for indicating that the distance measurement is in an abnormal condition.

2. A device as claimed in claim 1 further comprising second means responsive to said signaling measn for detecting when all of the light sensing portions are in the light receiving condition, said output producing means further being connected to said second detecting means for producing an output in response to the detection by said second means.

3. A device as claimed in claim 1, wherein said output producing means comprises means for emitting a sensible warning signal.

4. A device as claimed in claim 3, wherein said emitting means is a visual signal generator.

5. A distance measuring device which comprises:
means for directing a beam of light towards a target object;
means for receiving the beam of light reflected by the target object, said receiving means having a plurality of at least three light sensing portions, the optical axes of which intersect the path of travel of said beam of light in different ranges of distance from said directing means;

means responsive to said receiving means for signaling whether conditions of the respective light sensing portions are light sensing or non-light sensing; and logic circuit means having means for logically processing the outputs from said signaling means for each of all relationships of any of said sensing portion's condition with all other sensing portions' conditions to generate an output for each of such relationships, said relationships including a group of relationships where the light sensing portions, the optical axes of which intersect the path of travel of beam of light in non-neighboring ranges of distance, are in the light receiving condition, and further having means connected to said processing means for generating an output which is identical for all of the relationships in said group.

6. A device as claimed in claim 5 further comprising means connected to said logic circuit means for determining a target object distance in response to the outputs of said logic circuit means.

7. A device as claimed in claim 5 further comprising warning means connected to said output generating means for warning that the distance measurement is in an abnormal condition in response to said identical signal for the relationships in said first group.

8. A device as claimed in claim 7, wherein said relationships in said first group further include a relationship where all of the light sensing portions are in the light receiving condition, and said logic circuit means comprises means responsive to said lastmentioned relationship for generating an output which is identical with that for the other relationships in said group.

9. A device as claimed in claim 7, wherein said warning means includes means for emitting a sensible warning signal.

10. A device as claimed in claim 7, wherein said emitting means is a visual signal generator.

11. A device as claimed in claim 7 further comprising means for indicating a predetermined object distance in response to said identical signal.

* * * * *